G. P. SCHOLL.
PROCESS OF MANUFACTURING MIXED HYDROGEN AND NITROGEN.
APPLICATION FILED OCT. 6, 1908.
1,123,394.
Patented Jan. 5, 1915.
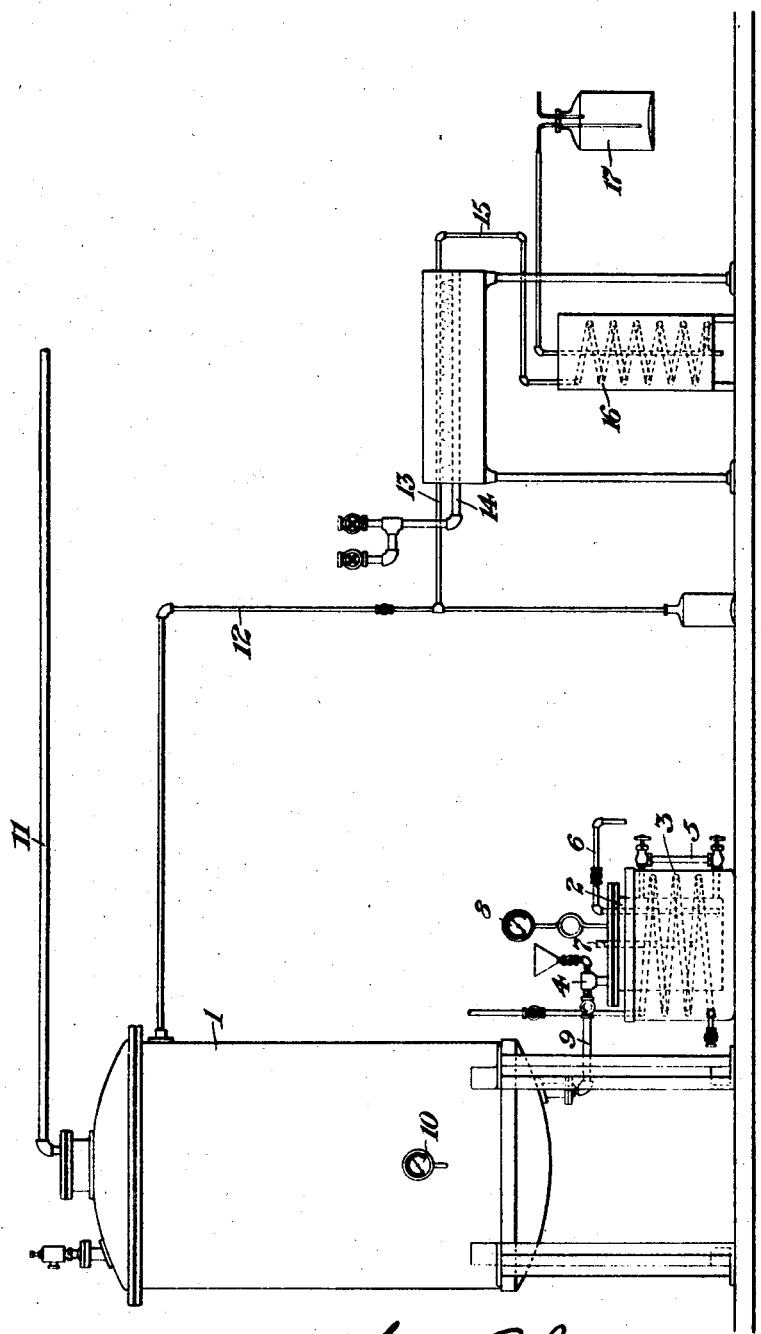

UNITED STATES PATENT OFFICE.

GEORGE P. SCHOLL, OF NEW YORK, N. Y., ASSIGNOR TO WESTINGHOUSE LAMP COMPANY, A CORPORATION OF PENNSYLVANIA.

PROCESS OF MANUFACTURING MIXED HYDROGEN AND NITROGEN.

1,123,394.     Specification of Letters Patent.     Patented Jan. 5, 1915.

Application filed October 6, 1908. Serial No. 456,474.

*To all whom it may concern:*

Be it known that I, GEORGE P. SCHOLL, a citizen of the United States, and resident of New York, county of New York, State of New York, have invented certain new and useful Improvements in Processes of Manufacturing Mixed Hydrogen and Nitrogen, of which the following is a specification.

In certain chemical operations it is desired to use a mixture of nitrogen and hydrogen. Heretofore it has been customary to obtain hydrogen and nitrogen separately and to then mix them. Thus, for instance, it has been the practice to obtain the hydrogen by electrolytic action upon water and to obtain nitrogen by the decomposition of air by passing the air over heated copper tubes in the presence of more or less ammonia.

My invention aims to produce a mixture of nitrogen and hydrogen by a single operation, and this is accomplished by employing ammonia as the source of both the nitrogen and hydrogen and adding only sufficient air to make the hydrogen percentage low enough for the required purposes. Ammonia alone will yield about 75% of hydrogen and 25% of nitrogen.

In the treatment of tungsten compounds for the purpose of obtaining tungsten for the manufacture of incandescent electric lamps, it is found desirable to have a mixture of nitrogen and hydrogen much less rich in hydrogen and richer in nitrogen than the above. Usually about 50% of hydrogen and 50% of nitrogen makes a very effective mixture. Therefore, enough air is added to the ammonia to bring about the proper proportions.

The process of operation consists in using a closed vessel in which ammonia is vaporized by steam pipes, or in some other convenient manner until a pressure of twenty or thirty pounds is obtained in the vessel. This is drawn into a reservoir until a predetermined pressure, say, five pounds is shown by the reservoir gage. To this there is admitted the requisite amount of air under pressure until the pressure gage of the reservoir indicates a predetermined pressure, say, ten pounds, although there may be, without material detriment, a slight excess of the ammonia. This mixture is then introduced into iron pipes containing copper turnings or other forms of copper exposing considerable surface and which are heated to a high temperature in any desirable manner. The ammonia and air passing over the copper turnings are disassociated into nitrogen and hydrogen and the resulting mixture of gases passes into a condensing tank for removing the steam and then through purifying bottles containing sulfuric acid to remove any excess of ammonia. It may then be passed through a solution of ferrous-sulfate which acts as an indicator and turns black or very dark when the remnant of oxygen is unduly large, although this latter precaution is not necessary when accurate portions of air and ammonia are observed.

The accompanying drawing shows a convenient arrangement of apparatus for carrying out my invention.

Referring to the drawing, 1 represents a lead-lined storage and mixing tank for receiving the mixture of ammonia and air; 2 is the ammonia generator which is shown as being surrounded by a steam pipe, 3, for heating the generator. The generator is supplied with an inlet, 4, for supplying the liquid ammonia, and with a gage, 5, for indicating the amount of liquid ammonia in the generator. A siphon, 6, is provided for drawing off the ammonia when desired, and a thermometer, 7, is provided for indicating the temperatures; likewise, a pressure-gage, 8, for indicating the pressure. A pipe, 9, leads to the storage tank 1, and the pressure of ammonia gas admitted into the tank is indicated by the gage 10. The air is admitted into the storage tank through a pipe, 11, under pressure, in any convenient manner. A pipe, 12, leads the mixed ammonia gas and air from the tank to iron pipes 13, containing masses of copper turnings. These pipes are heated by burners, 14, supplied with air and gas in the proper proportions. The constituents of the ammonia and air passing over the copper turnings are disassociated and hydrogen and nitrogen are drawn off through the pipe 15, and passed through a condenser-coil 16, which extracts the water formed by the chemical reactions. The mixture of hydrogen and nitrogen is then passed through wash bottles, 17, and is then ready for use for whatever purpose desired. A special use to which it is peculiarly applicable is the preparation of tungsten filaments for incandescent electric lamps.

While, what may be termed a correct chemical equation, cannot be given for the reaction which occurs when the mixed gases pass over heated copper, the following equation indicates the said reaction approximately:

$$3NH_3 + (N_4 + O) = H_2O + 7H + 7N.$$

In actual practice, six cubic feet of ammonia are mixed with five cubic feet of air, and fourteen cubic feet of mixed gases are obtained therefrom, containing approximately 50% of hydrogen and 50% of nitrogen. The heated copper apparently does not take an active part in the reaction, but serves merely as a sort of catalyzer, and in all probability is oxidized and reduced continually. For the best results, the copper should be heated to approximately 720° centigrade, though good results may be obtained at other temperatures.

My process is capable of application over a wide range of gas mixtures. The upper limit of the amount of air that may be mixed with the ammonia is represented by the equation $$2NH_3 + 3(N_4 + O) = 3H_2O + 14N.$$

In this mixture the hydrogen of the ammonia is just sufficient to take up the oxygen of the air and the addition of more air would result in the presence of free oxygen in the final product, with disastrous results.

From the amount indicated in the above equation, the proportion of air in the initial mixture may be reduced to an infinitesimal amount, the proportions of nitrogen to hydrogen in the final product approaching three to one as a limit, as indicated, for example, by the following reaction:

$$1000NH_3 + (N_4 + O) = H_2 + 1004N + 2098H.$$

Between the limits thus indicated, the relation between the proportions of ammonia and air in the initial mixture and the proportions between the nitrogen and hydrogen in the final mixture follows a readily ascertainable law. Letting "R" represent the desired ratio of nitrogen to hydrogen in the final mixture and "X" the ratio of ammonia to air that must be used in the initial mixture to give the result "R", it is found that $$X = \frac{2R+4}{3R-1}.$$

My invention is not limited to any specific ratios of gases but I may employ any mixtures between the above indicated limits.

Since, at constant temperature, the volume of a gas is inversely proportional to the absolute pressure (Boyle's law) it follows that, having derived "X" from the above equation, the relation between the absolute pressures of the ammonia gas and the ammonia air mixture may be ascertained. Letting "P" represent the absolute pressure of the ammonia, of any desired convenient value, the absolute pressure of the ammonia air mixture is greater than P in the ratio $$\frac{X+1}{1}$$

It will be understood that all the above noted relations are based on the assumption that air is composed of four parts of nitrogen to one part of oxygen. While such is not the actual composition of the atmosphere, yet it differs therefrom only by such a small amount that the discrepancies are entirely negligible.

I claim as my invention:

1. The process of making a mixture of nitrogen and hydrogen having definite proportions, which consists in vaporizing ammonia, holding the vaporized ammonia under a given pressure, adding air under pressure until the mixture reaches a predetermined pressure, and dissociating the ammonia of the mixture.

2. The method of obtaining a mixture of nitrogen and hydrogen wherein the ratio of nitrogen to hydrogen has a value R which comprises mixing ammonia gas and air in a ratio X, where X equals substantially $$\frac{2R+4}{3R-1},$$

dissociating the ammonia of the mixture and combining the oxygen of the air with hydrogen.

3. The method of obtaining a mixture of nitrogen and hydrogen wherein the ratio of nitrogen to hydrogen has a value R which comprises mixing ammonia gas and air in a ratio X, where X equals substantially $$\frac{2R+4}{3R-1},$$

by charging a closed container with ammonia gas, introducing air until the absolute pressure within the container is increased substantially in the ratio $$\frac{X+1}{1},$$

and passing the mixture over a catalytic agent, whereby the ammonia of the mixture is dissociated and the oxygen of the air combined with hydrogen.

4. The method of obtaining a gas mixture comprising substantially equal parts of hydrogen and nitrogen which comprises charging a closed container with ammonia gas, ascertaining the absolute pressure thereof, introducing air until the absolute pressure within the container is approximately four times the absolute pressure of the ammonia, and passing the gas mixture over a catalytic agent, whereby the ammonia is dissociated and the oxygen of the air caused to combine with hydrogen.

Signed at New York, in the county of New York, and State of New York, this 28th day of September, A. D. 1908.

GEORGE P. SCHOLL.

Witnesses:
WM. H. CAPEL,
THOS. H. BROWN.

---

Correction in Letters Patent No. 1,123,394.

It is hereby certified that in Letters Patent No. 1,123,394, granted January 5, 1915, upon the application of George P. Scholl, of New York, N. Y., for an improvement in "Processes of Manufacturing Mixed Hydrogen and Nitrogen," an error appears in the printed specification requiring correction as follows: Page 2, line 45, for the symbol "$H_2$" read $H_2O$; and that the said Letters Patent should be read with this correction therein that the same may conform to the record of the case in the Patent Office.

Signed and sealed this 26th day of January, A. D., 1915.

[SEAL.]

R. F. WHITEHEAD,
*Acting Commissioner of Patents.*